Dec. 13, 1955  E. VALLET  2,726,661
IMPROVEMENTS IN COMPARTMENTING DEVICES
Filed Oct. 8, 1952
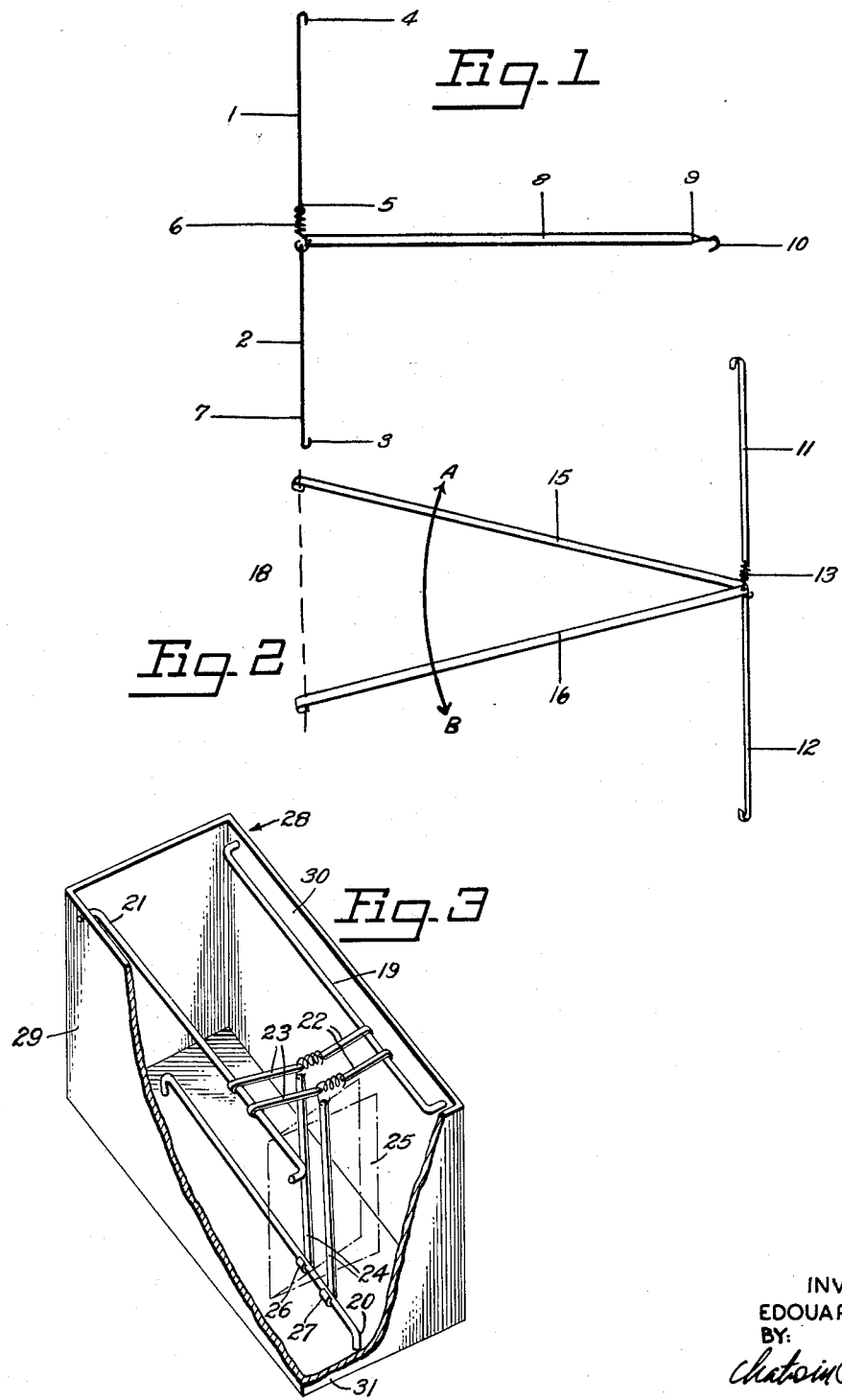
INVENTOR
EDOUARD VALLET
BY:
*Chatoin & Company*
ATTORNEYS United States Patent Office 2,726,661
Patented Dec. 13, 1955

2,726,661

IMPROVEMENTS IN COMPARTMENTING DEVICES

Edouard Vallet, Marseille, France

Application October 8, 1952, Serial No. 313,750

Claims priority, application France October 12, 1951

3 Claims. (Cl. 129—26)

This invention relates to compartmenting means for a receptacle such as a filing cabinet.

It is the object of the present invention to provide an improved and simplified construction of compartmenting means which is readily movable for alteration of the size of the compartments formed, which is extremely simple and light in construction and which is strong enough to serve if required, as a supporting means for filed material.

Three embodiments of the invention are illustrated in the accompanying drawing, wherein:

Fig. 1 is a side elevation of a first form of compartmenting device; Fig. 2 is a side elevation of a second form of compartmenting device; Fig. 3 shows a method of application of a third form of compartmenting device to a receptacle.

In Fig. 1 the compartmenting device consists of two rigid rods 1 and 2 the respective outer ends of which have hooks 4 and 3. The adjacent ends of the rods have apertures 5 through which are hooked the ends of a tension spring 6. 8 is a strainer link secured in similar manner on the spring 6, and 9 is a hooked end for the link 8.

In Fig. 2 the compartmenting device consists of two rods 11 and 12 and a tension spring 13, similarly as for Fig. 1, and to which are coupled two strainer links 15 and 16 each having a hooked free end 18.

Fig. 3 shows a receptacle 28 having coupling bars 19, 20, and 21. The receptacle 28 is depicted lying on its base 31, the coupling bar 21 being on the front wall thereof, the coupling bar 19 on the parallel rear wall 30 thereof, and the coupling bar 20 on the base 31 thereof joining said walls. Two compartmenting devices are secured with their rods 22 and 23 coupled to the rear and front wall coupling bars respectively and their strainer link 24 connected to the base coupling bar 20 by hooks 26, 27. 25 is a letter or the like to be filed. It will be appreciated that the compartmenting devices can be slid along the coupling bars to provide compartments of the desired width. In the position shown, the material to be filed is inserted into the receptacle between the coupling bars 19 and 21.

I claim:

1. In combination with a receptacle having parallel front and rear walls and a base joining said walls, a compartmenting device comprising a first rod coupled at one end to the front wall, a second separate rod coupled at one end to the rear wall, a tension spring hooked at its ends through the other ends of the rods and under tension, the assembly of rods and spring lying perpendicularly between the front and rear walls, and a strainer link connected between that end of one of the rods through which the spring is hooked and a point of the base vertically below the assembly of rods and spring, the length of the strainer link being such that the ends of the rods through which the spring is hooked are pulled towards the base.

2. In combination with a receptacle having parallel front and rear walls, a base joining said walls, a first coupling bar on the front wall parallel to the base, a second coupling bar on the rear wall parallel to the base, and a third coupling bar on the base intermediate of and parallel to the front and rear walls, a compartmenting device comprising a first rod having at one end a hook slidably engaged on the coupling bar of the front wall, a second rod having at one end a hook slidably engaged on the coupling bar of the rear wall, a tension spring hooked through and connecting under tension the other ends of the rods, the assembly of rods and spring lying perpendicularly between the front and rear walls, and a strainer link connected at one end to that end of one of the rods through which the spring is hooked, said strainer link having at its other end a hook slidably engaged on the coupling bar of the base at a point vertically below the assembly of rods and spring, the length of the strainer link being such that the ends of the rods through which the spring is hooked are pulled towards the base.

3. In combination with a receptacle having parallel front and rear walls, a base joining said walls, a coupling bar on the front wall parallel to the base, a coupling bar on the rear wall parallel to the base, and a coupling bar on the base, a compartmenting device comprising a first rod having at one end a hook slidably engaged on the coupling bar of the front wall, a second rod having at one end a hook slidably engaged on the coupling bar of the rear wall, a tension spring hooked through and under tension between the other ends of the rods, the assembly of rods and spring lying perpendicularly between the front and rear walls, and two strainer links connected each at one end to that end of one of the rods through which the spring is hooked, said strainer links each having at the other end a hook slidably engaged on the coupling bar of the base, the points of engagement of the hooks on the strainer links with the coupling bar on the base being vertically below the assembly of rods and spring and the lengths of the strainer links being such that the ends of the rods through which the spring is hooked are pulled towards the base.

References Cited in the file of this patent

UNITED STATES PATENTS

| Number | Name | Date |
|---|---|---|
| 524,834 | Mayent | Aug. 21, 1894 |
| 957,423 | Klepfer | May 10, 1910 |
| 1,962,730 | Boyd | June 12, 1934 |
| 2,538,165 | Randtyke | Jan. 16, 1951 |